United States Patent [19]
Tarumi et al.

[11] Patent Number: 5,837,774
[45] Date of Patent: Nov. 17, 1998

[54] CURABLE FLUOROPOLYETHER RUBBER COMPOSITION

[75] Inventors: Yasuo Tarumi; Kenichi Fukuda, both of Takasaki, Japan

[73] Assignee: Shin-Etsu Chemical Co., Ltd., Tokyo, Japan

[21] Appl. No.: 594,671

[22] Filed: Feb. 2, 1996

[30] Foreign Application Priority Data

Feb. 3, 1995 [JP] Japan .................................. 7-039173
Mar. 27, 1995 [JP] Japan .................................. 7-092989

[51] Int. Cl.$^6$ ............................ C08L 27/18; C08L 83/05
[52] U.S. Cl. .......................... 525/104; 525/102; 525/100
[58] Field of Search .................................. 525/104, 102, 525/100

[56] References Cited

U.S. PATENT DOCUMENTS 4,565,714 1/1986 Koshar .................................. 427/54.1
4,818,619 4/1989 Strepparola et al. .................. 428/421

*Primary Examiner*—Mark L. Warzel
*Attorney, Agent, or Firm*—Oblon, Spivak, McClelland, Maier & Neustadt, P.C.

[57] ABSTRACT

Curable fluoropolyether rubber composition: This composition comprises (A) a straight chain fluoropolyether compound having at least two alkenyl groups in its molecule and having a divalent perfluoropolyether structure in its backbone chain, (B) a polytetrafluoroethylene, (C) an organohydrogenpolysiloxane having at least two hydrogen atoms bonded to silicon atoms in its molecule, and (D) a hydrosilylation reaction catalyst. The composition is provided in the form of a paste capable of forming into optional shapes, and its cured product is well-balanced in and is excellent in properties such as heat resistance, chemical resistance, solvent resistance, releasability, lubricating qualities, water repellency, oil repellency and weatherability.

11 Claims, No Drawings

CURABLE FLUOROPOLYETHER RUBBER COMPOSITION

BACKGROUND OF THE INVENTION

1. Field of the Invention

This invention relates to a curable fluoropolyether rubber composition capable of producing a cured product excellent in water repellency, oil repellency, solvent resistance, chemical resistance, weatherability, releasability, lubricating qualities and the like.

2. Description of the Prior Art

Industrially produced fluorine-containing polymer materials are broadly employed as resins, rubbers, coating agents, paints, various film materials, and the like, because of fluorine's excellent properties such as heat resistance, chemical resistance, solvent resistance, releasability, lubricating qualities, water repellency, oil repellency, and weatherability. However, these properties don't appear necessarily in all types of fluorine-containing polymer materials. For example, polytetrafluoroethylene, which is the most typical material of fluorine-containing polymer materials, has all the above characteristics, but there is known no fluorine-containing rubbers having all these properties.

Further, vinylidene fluoride-hexafluoropropylene (or additionally -tetrafluoroethylene) rubbers are inferior in resistance to strongly polarized solvents or chemicals and poor in surface characteristics, such as releasability and lubricating qualities, and resistance to low temperatures required sometimes for rubber materials. Similarly, even so-called perfluororubbers, which are tetrafluoroethylene-perfluoroalkyl vinyl ether, are poor in releasability, lubricating qualities, processing characteristics, and the like.

SUMMARY OF THE INVENTION

An object of the present invention is to provide a curable fluoropolyether rubber composition capable of producing fluororubbers well-balanced in and excellent in properties such as heat resistance, chemical resistance, solvent resistance, releasability, lubricating qualities, water repellency, oil repellency and weatherability.

The present invention provides a curable fluoropolyether rubber composition comprising:

(A) a straight chain fluoropolyether compound having at least two alkenyl groups in its molecule and having a divalent perfluoropolyether structure in its backbone chain, (B) a polytetrafluoroethylene,
(C) an organohydrogenpolysiloxane having at least two hydrogen atoms bonded to silicon atoms in its molecule, and
(D) a hydrosilylation reaction catalyst.

The composition of this invention is in the form of a paste capable of forming readily into any desired shapes, and its cured product is well-balanced in and is excellent in properties such as heat resistance, chemical resistance, solvent resistance, releasability, lubricating qualities, water repellency, oil repellency and weatherability.

DETAILED DESCRIPTION OF THE PREFERRED EMBODIMENTS

The present invention is hereinafter described in detail.

Component (A): straight chain polyether compound

The straight chain fluoropolyether compound used in this invention has a divalent perfluoropolyether structure in its backbone chain. The perfluoropolyether structure includes, for example, ones represented by the following general formula (2):

wherein Rf is a straight chain or branched perfluoroalkylene group having 1 to 6 carbon atoms, preferably 1 to 3 carbon atoms, and q is an integer of 1 to 500, preferably 2 to 400, more preferably 10 to 200.

The repeating unit represented by said —(Rf—O)— includes, for example, —$CF_2O$—, —$CF_2CF_2O$—, —$CF_2CF_2CF_2O$—, —$CF(CF_3)CF_2O$—, —$CF_2CF_2CF_2CF_2O$—, —$CF_2CF_2CF_2CF_2CF_2O$—and —$C(CF_3)_2O$—; among which preferred are —$CF_2O$—, —$CF_2CF_2O$—, —$CF_2CF_2CF_2O$—and —$CF(CF_3)CF_2O$—. Said perfluoropolyether structures may be comprised of one of the repeating units represented by these —(Rf—O)— or a combination of two or more thereof.

The alkenyl group contained in the straight chain fluoropolyether compound of said component (A) includes, for example, that having a $CH_2$=CH— structure at the ends, such as vinyl, allyl, propenyl, isopropenyl, butenyl, and hexenyl groups, preferably vinyl and allyl groups. The alkenyl group may be bonded directly to both ends of the backbone chain of the straight chain fluoropolyether compound or may be bonded through a divalent connecting group such as —$CH_2$—, —$CH_2O$—, or —Y—NR—CO— wherein Y is —$CH_2$— or a group represented by the formula:

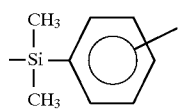

(o-, m- or p-position), and R is a hydrogen atom, a methyl group, a phenyl group or a allyl group.

Typical examples of the straight chain fluoropolyether compound used in the present invention include, for example, a fluoropolyether compound having a molecular weight of 400 to 100,000, preferably 1,000 to 50,000, represented by the following general formula (1):

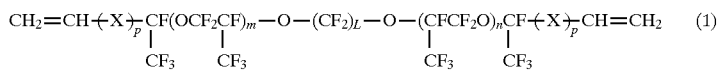

wherein X are independently —$CH_2$—, —$CH_2O$— or —Y—NR—CO— wherein Y is —$CH_2$— or a group represented by the formula:

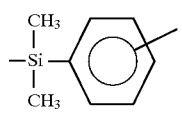

(o-, m- or p-position), and R is a hydrogen atom, a methyl group, a phenyl group or an allyl group; p are independently 0 or 1, L is an integer of 2 to 6, and m and n are each an integer of 0 to 200, preferably 5 to 100. Specific examples of the fluoropolyether compound represented by the general formula (1) include straight chain fluoropolyether compounds represented by the following formulas:

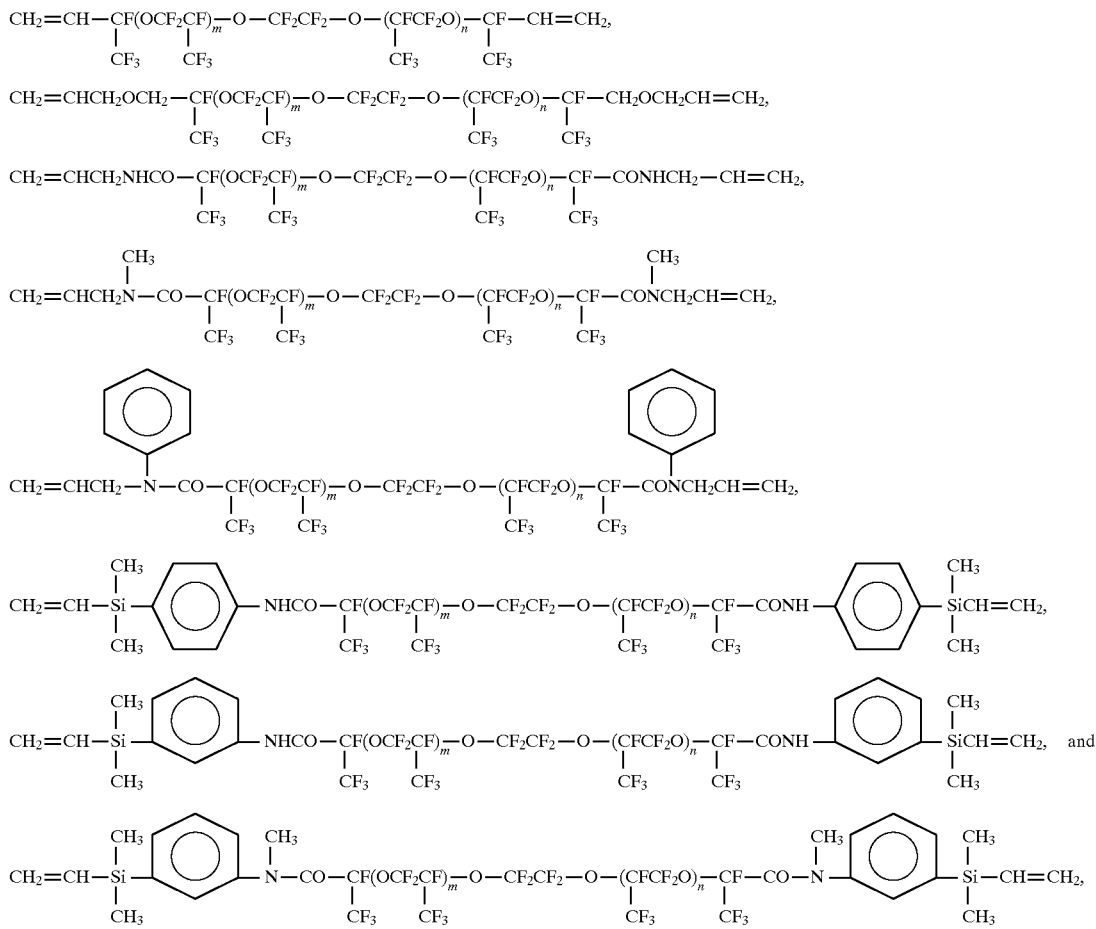

wherein m and n are each as defined in the above formula (1).

Further, in order to previously adjust the molecular weight of the straight chain fluoropolyether compound to a desired value depending upon its uses, the component (A) may be a chain-extended product obtained by subjecting a straight chain fluoropolyether compound having said general formula (1) and an organosilicon compound having two SiH groups in its molecule to hydrosilylation reaction to thereby extend the chain length of the fluoropolyether compound. Examples of the organosilicon compound having two SiH groups in its molecule include a straight chain or cyclic organohydrogenpolysiloxane such as a compound represented by the following formula:

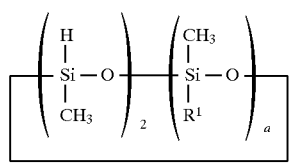

wherein $R^1$ is a methyl group, an ethyl group, a propyl group or a 3,3,3-trifluoropropyl group, and a is 1 or 2; and a compound represented by the following formula:

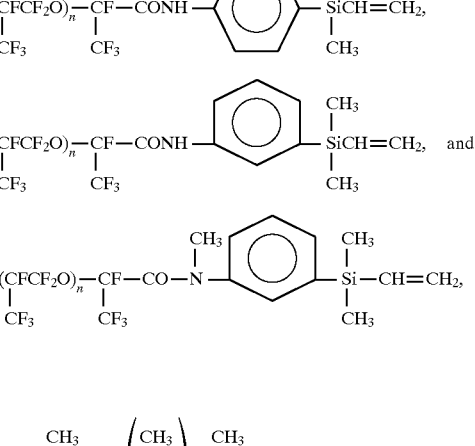

wherein $R^2$ is a methyl group or a 3,3,3-trifluoropropyl group, and b is an integer of 0 to 6; and preferably a compound represented by the following formula:

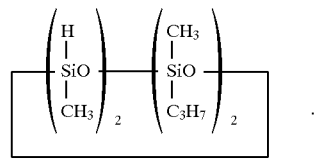

A reaction product obtained by reacting at least one of these compounds with, for example, a compound represented by the formula (1) so that the product has a desired chain length, may be also used as the component (A). For example, there is enumerated a reaction product obtained by a reaction represented by the following formulas:

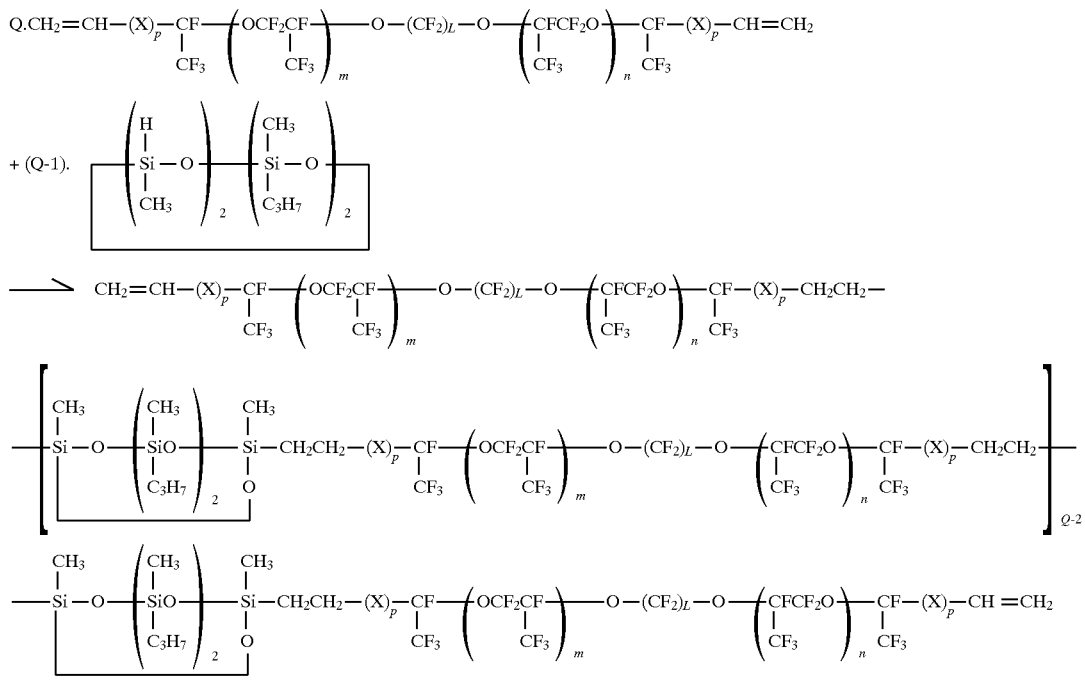

wherein p, m, L and n are as defined above, and Q is a reaction mole number.

Component (B): polytetrafluoroethylene

The polytetrafluoroethylene of the component (B) used in the present invention includes a homopolymer of tetrafluoroethylene, and a thermal decomposition product thereof. Preferable polytetrafluoroethylenes include a homopolymer having a molecular weight of at least 2,000, particularly about 2,000 to 5,000,000, and a telomer having a molecular weight of about 2,000 to 5,000,000 obtained by polymerizing tetrafluoroethylene in the presence of a telogen. Incidentally, the terms "telogen" and "telomer" teach have the same meaning as defined in the specification of U.S. Pat. No. 2,440,800.

The telomers used herein include a tetrafluoroethylene telomer represented by the following formula:

These telomers contain at least 85% by weight, preferably at least 90% by weight, of tetrafluoroethylene, within the range of the above-mentioned molecular weights. In this formula, the groups X and Y are derived from a molecule X-Y (telogen). The tetrafluoroethylene telomer is prepared by polymerizing tetrafluoroethylene in the presence of the X-Y to thereby introduce the X-Y element into the telomer. The molecular X-Y should be capable of cleavage under the conditions of polymerization and includes wide range kinds of compounds. The preparation method is taught in the specifications of U.S. Pat. Nos. 2,411,158; 2,433,844; 2,443,003; 2,540,088; 2,562,547; 3,019,261; and 3,067,262. The molecular weight of a telomer is first related to the activity of a telogen. A relatively active telogen as described in U.S. Pat. No. 3,067,262 specification provides a low molecular weight telomer. A relatively unreactive telogen such as, for example, trichlorotrifluoroethane provides a high molecular weight telomer. British Patent 583,874 specification also discloses tetrafluoroethylene telomers in detail.

The telogens X-Y as mentioned above include, for example, aliphatic hydrocarbons where X is a hydrogen atom, and Y is a hydrocarbon radical; aliphatic ethers each containing α-hydrogen where X is a hydrogen atom, and Y is an ether radical; tertiary amines where X is a hydrogen atom, and Y is an amine radical; aliphatic alcohols where X is an hydrogen atom, and Y is an alcohol radical; mercaptans where X is a hydrogen atom, and Y is a mercaptan radical; disulfides where X and Y are each RS- wherein R is a hydrogen atom or a monovalent hydrocarbon group; aliphatic carbonyl compounds (aldehydes, ketones, diketones, ketonic acids, ketonitriles and acids) each containing α-hydrogen where X is a hydrogen atom, and Y is a carbonyl compound radical; dialkylamides where X is a hydrogen atom, and Y is an amide radical; and aliphatic halohydrocarbons each containing a halogen other than fluorine where X is a halogen atom, and Y is a radical. They may be used singly or in a combination of two or more thereof.

Specific examples of each of the above telogens include, for example, butane, isobutane, methylcyclohexane, 2,3-dimethylbutane, tetrahydrofuran, diethyl ether, dioxane, trimethylamine, triethylamine, methanol, ethanol, isopropanol, secondary butanol, cyclohexanol, ethyl mercaptan, butyl mercaptan, dodecyl mercaptan, dimethyl disulfide, diethyl disulfide, dibutyl disulfide, acetaldehyde, propionaldehyde, butylaldehyde, acetone, butanone, 2,4-pentanedione, acetoacetic acid, acetic acid, butyric acid, ethyl acetate, dimethylformamide, dimethylacetamide, carbon tetrachloride, chloroform, carbon tetrabromide, bromoform, methyl chloride, hexachloroethane, monofluorotrichloromethane, trichlorotrifluoroethane, difluorotetrachloroethane, sulfur dioxide, and mercaptans. Preferable tetrafluoroethylene polymers are telomers prepared from tetrafluoroethylene and trichlorotrifluoroethane.

In case where tetrafluoroethylene telomer is used, a dispersion in which the telomer has been dispersed in an amount of 1 to 50% by weight in a solvent can be used. The polytetrafluoroethylene resin of the component (B) is preferably spherical fine particles having an average particle diameter of 0.1 to 20 μm, particularly about 1 to 10 μm.

The amount of the component (B) added is 5 to 50 parts by weight, preferably 10 to 30 parts by weight, per 100 parts by weight of the straight chain fluoropolyether compound, the component (A).

Component (c): organohydrogenpolysiloxane having at least two hydrogen atoms bonded to silicon atoms in its molecule The organohydrogenpolysiloxane of the component (C) used in the present invention is a straight chain, branched or cyclic organohydrogenpolysiloxane having at least two, preferably three or more, hydrogen atoms (namely, SiH group) bonded to silicon atoms in its molecule. The organohydrogenpolysiloxane of the component (C) includes, for example, a straight chain or cyclic organohydrogenpolysiloxane having, in its molecule, at least two, preferably three or more, units represented by the following formula:

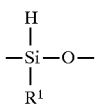

wherein $R^1$ in the plural units are monovalent organic groups, which may be the same or different, such as a substituted or unsubstituted monovalent hydrocarbon group having 1 to 20 carbon atoms, preferably ones having 1 to 12 carbon atoms and being free of aliphatic unsaturation, and a fluorine-containing monovalent organic group having 3 to 30 carbon atoms, preferably 6 to 20 carbon atoms, represented by the formula —Z—Rf wherein Z is a divalent connecting group for connecting Rf to Si, and Rf is a monovalent perfluoroalkyl group or a monovalent perfluoroalkyl ether group.

The above substituted or unsubstituted hydrocarbon group having 1 to 20 carbon atoms includes, for example, an alkyl group such as methyl, ethyl, propyl, butyl, hexyl, cyclohexyl, octyl and decyl groups; an alkenyl group such as vinyl and allyl groups; an aryl group such as phenyl, tolyl and naphthyl groups; an aralkyl group such as benzyl and phenylethyl groups; and a group derived from said groups by substituting part of the hydrogen atoms contained in these groups with a chlorine atom, a cyano group or the like, such as chloromethyl, chloropropyl and cyanoethyl groups.

The above monovalent perfluoroalkyl group or perfluoroalkyl ether group includes, for example, —CF$_3$, —CF$_2$CF$_3$, —C$_3$F$_7$, —C$_4$F$_9$, —C$_6$F$_{13}$, —C$_8$F$_{17}$, —C(CF$_3$)F—OC$_3$F$_7$, —C(CF$_3$)F—OCF$_2$C(CF$_3$)F—OC$_3$F$_7$, CF$_2$CF$_2$—OCF$_2$C(CF$_3$)F—OC$_3$F$_7$ and —C(CF$_3$)F—[OCF$_2$C(CF$_3$)F]$_2$—OC$_3$F$_7$.

As the divalent connecting group represented by Z, there are enumerated an alkylene group, an arylene group and a combination thereof; and a group in which said groups are each present through an ether-bonding oxygen atom, an amido bond, a carbonyl bond or the like. Specific examples of the divalent connecting group include those having 2 to 12 carbon atoms, such as —CH$_2$CH$_2$—, —CH$_2$CH$_2$CH$_2$—, —CH$_2$CH$_2$CH$_2$OCH$_2$—, —CH$_2$CH$_2$CH$_2$—NH—CO—, —CH$_2$CH$_2$CH$_2$—N(Ph)—CO— wherein Ph stands for a phenyl group (the same being applied hereinafter), —CH$_2$CH$_2$CH$_2$—N(CH$_3$)—CO—, and —CH$_2$CH$_2$CH$_2$—O—CO—.

In addition to the divalent siloxane unit having a Si—H group as mentioned above, the organohydrogenpolysiloxane may generally have a repeating unit represented by the following formula:

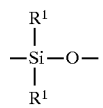

wherein $R^1$ has the same meaning as above, or a terminal group represented by at least one of the following formulas:

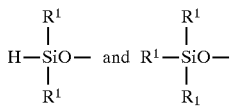

wherein $R^1$ has the same meaning as above.

The organohydrogenpolysiloxane has preferably at least one monovalent fluorine-containing organic group represented by the above formula —Z—Rf in its molecule, from the viewpoint of compatibility with the component (A), etc. Generally, an organohydrogenpolysiloxane having about 3 to 100, particularly about 4 to 60, silicon atoms in its molecule is suitably used.

Specific examples of the organohydrogenpolysiloxane, the component (C), used in the present invention include, for example:

an organohydrogenpolysiloxane represented by the formula:

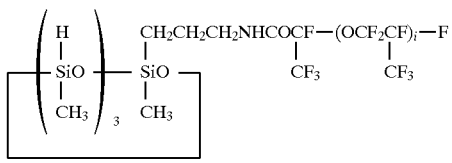

wherein i is 1, 2, 3 or 4;

an organohydrogenpolysiloxane represented by the formula:

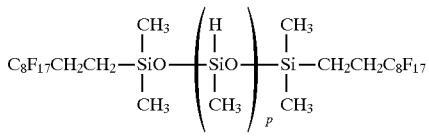

wherein p is an integer of 2 to 50; and an organohydrogenpolysiloxane represented by the formula:

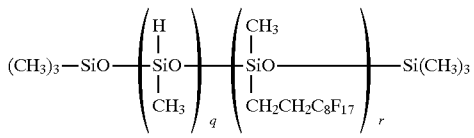

wherein q is an integer of 2 to 50, and r is an integer of 0 to 5.

The amount of the component (C) added is 0.1 to 20 parts by weight, preferably 1 to 15 parts by weight, per 100 parts by weight of the straight chain fluoropolyether compound, the component (A). Further, the amount of the component (C) may be set so that the content of the hydrogen atoms (namely, SiH groups) bonded to the silicon atoms contained in the component (C), based on the alkenyl groups contained in the component (A), is 0.5 to 5 mole/mole, preferably about 1 to 3 mole/mole, in terms of molar ratio.

Component D: hydrosilylation reaction catalyst

The catalyst of the component (C) used in the present invention includes transition metals, for example, platinum group metals such as Pt, Rh and Pd; and compounds of these transition metals. Specific examples of the catalyst include modified complexes of $H_2PtCl_6$ with olefins, modified complexes of $H_2PtCl_6$ with alcohols, modified complexes of $H_2PtCl_6$ with vinylsiloxanes, $RhCl_3$, $Rh(CH_3COCHCOCH_3)_3$, $Rh(PPh_3)_3Cl$, $Rh(PPh_3)_3Br$, $Rh_2(AcO)_4$ wherein Ac stands for an acetyl group, $Rh(PPh_3)_2(CO)Cl$, $Rh(\eta^4-C_7H_8)Cl$, $Rh(CH_3COCHCOCH_3)(CO)_2$, $Rh_4(CO)_{12}$, $Rh(CO)_{16}$, $Rh(PPh_3)_3(CO)H$, $(NH_4)_2PdCl_6$, $(NH_4)_2PdCl_4$, $Pd(CH_3COCHCOCH_3)_2$, $Pd(PhCN)_2Cl_2$, $Pd(PPh_3)_2Cl_2$ and $Pd(PPh_3)_4$.

The amount of the component (C) added may be 0.1 to 500 ppm, preferably about 0.5 to 200 ppm, in terms of the amount of a transition metal, such as platinum group metals, based on the total weight of the component (A) and the component (C).

Other components

In addition to the above components (A) to (D), conventionally known various additives may be optionally added to the composition of the present invention in such amounts that the effects of the present invention are not injured. Such other components include, for example, control agents for hydrosilylation reaction catalysts, such as 1-ethyl-1-hydroxycyclohexane, 3-methyl-1-butyn-3-ol, 3,5-dimethyl-1-hexyn-3-ol and 3-methyl-1-pentene-3-ol, acetylene alcohols (e.g. phenylbutynol), 3-methyl-3-pentene-1-yne, and 3,5-dimethyl-3-hexene-1-yne; adhesion-providing agents such as an organosiloxane containing an alkoxy group, an epoxy group and a SiH group in its molecule, for example:

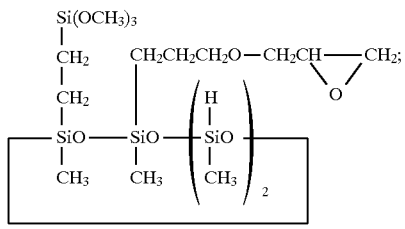

pigments such as iron oxide, cerium oxide and carbon black; colorants; dyes; and antioxidants.

Constitution of the composition

The composition of the present invention may be constituted as a so-called one-component type in which all the essential components, said components (A) to (D), are blended as only one composition in accordance with uses, or may be constituted as a two-component type in which, for example, one composition is made of part of the component (A), part of the sub-component(B), and the component (C), while the other sub-composition is made of the remainder of the component (A), the remainder of the component (B), and the component (D), in order to mix these two sub-compositions in use.

Curing

Although the composition of the present invention can be readily cured by being left to stand at room temperature or being heated, in general, it is preferred to thermally cure the composition at room temperature (for example, 10° to 30° C.) to 180° C. for 5 minutes to 24 hours.

EXAMPLES

The present invention is hereinafter described in more detail with reference to working examples and comparative examples Example 1

After 100 parts by weight of a fluoropolyether polymer represented by the following formula (2):

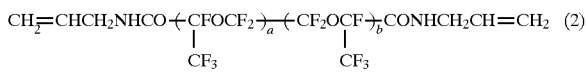

wherein a is an integer of 12 to 24, b is an integer of 12 to 24, provided that a+b equals to 36 on average, and 200 parts by weight of a 7.5 weight % trichlorotrifluoroethane dispersion (tradename: Vydax 1000, produced by E.I. du Pont de Nemours and Co.) of a tetrafluoroethylene telomer (average particle diameter: about 5 μm) having a molecular weight of 25,000 were mixed and then stirred for 10 minutes, the mixture was further stirred at 120° C. for 22 hours under vacuum to evaporate therefrom the trichlorotrifluoroethane into a cold lap. The thus obtained cake-like mixture was passed through a three-roll three times to produce a smooth paste-like base compound.

To 115 parts by weight of the base compound, 0.6 part by weight of a 50 % toluene solution of 1-ethynyl-1- hydroxycyclohexane and 0.6 part by weight of a toluene solution (content of platinum: 0.5 weight %) of a modified complex of chloroplatinic acid with vinylsiloxane were added and then blended in a Shinagawa mixer for 20 minutes. Thereafter, 10.9 parts by weight of a Si—H group-containing polysiloxane having a structure represented by the following formula:

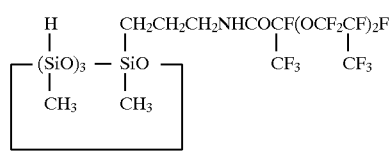

was added thereto, blended in the Shinagawa mixer for 10 minutes, and then further blended for 20 minutes under vacuum to produce a paste-like composition A.

The thus obtained composition A was formed into a sheet: having a thickness of 2 mm, and the sheet was cured. The forming and curing were conducted under the conditions of press cure being at 150° C. for 10 minutes under 100 kg/cm² and after cure being 150° C. for 50 minutes. The thus obtained rubber sheet as measured for the following physical properties and surface properties. The results are shown in Table 1.

Hardness (graduation), tensile strength (kgf/cm²) and elongation (%) were measured in accordance with JIS K 6301. Incidentally, measurement of hardness was conducted using a A type spring hardness tester.

Contact angle (with each of pure water and octane) was measured at 25° C. by a contact angle meter CA-DTA type manufactured by Kyowa Kaimen Kagaku Co., Ltd.

Friction coefficient was measured under the conditions of load: 200 gf, and velocity: 75 mm/min. by a surface properties-measuring apparatus Heidon 14 type manufactured by Shinto Kagaku Co., Ltd.

Surface lubricating qualities were evaluated by the feeling of finger touch in terms of superior (◉), good (○), fair (Δ), and inferior (X).

comparative Example 1

A paste-like composition B for comparison was prepared in the same manner as in Example 1, except that the Vydax 1000 was replaced by 10 parts by weight of fine powdery silica, which was obtained by surface-treating a silicic anhydride (tradename: Aerosil 300, produced by Degussa) having a specific surface area of 300 m²/g with hexamethyldisilazane. From the resulting composition B, a rubber sheet was prepared in the same manner as in Example 1, and the sheet was measured for the physical properties and the surface properties in the same measurement method as described in Example 1. The results are shown in Table 1.

Comparative Example 2

An oily composition C for comparison was prepared in the same manner as in Example 1, except that the Vydax 1000 was not used. From the resulting composition C, a rubber sheet was prepared in the same manner as in Example 1, and the sheet was measured for the physical properties and the surface properties in the same measurement method as described in Example 1. The results are shown in Table 1.

TABLE 1

|  | Example 1 Composition A | Comp. Example 1 Composition B | Comp. Example 2 Composition C |
| --- | --- | --- | --- |
| Hardness (graduation) | 41 | 57 | 35 |
| Tensile strength (kgf/cm²) | 24 | 46 | 18 |
| Elongation (%) | 300 | 200 | 230 |
| Specific gravity | 1.86 | 1.83 | 1.86 |
| Contact angle (pure water) | 113 | 119 | 119 |
| Contact angle (octane) | 55 | 42 | 44 |
| Friction coefficient | 0.6 | 0.9 | 1.1 |
| Surface lubricating qualities (finger touch) | ⊚ | ○ | Δ |

What is claimed is:

1. A curable fluoropolyether rubber composition comprising:
   (A) a straight chain fluoropolyether compound having at least two alkenyl groups in its molecule and having a divalent perfluoropolyether structure in its backbone chain,
   (B) a polytetrafluoroethylene,
   (C) an organohydrogenpolysiloxane having at least two hydrogen atoms bonded to silicon atoms in its molecule, and
   (D) a hydrosilylation reaction catalyst.

2. The rubber composition of claim 1, wherein the alkenyl group in the component (A) is a group having a CH$_2$=CH— structure at the ends.

3. The rubber composition of claim 1, wherein the perfluoropolyether structure in the component (A) is represented by the following general formula (2):

$$—(Rf—O)_q— \quad (2)$$

wherein Rf is a straight chain or branched perfluoroalkylene group having 1 to 6 carbon atoms, and q is an integer of 1 to 500.

4. The rubber composition of claim 1, wherein the component (A) is a fluoropolyether compound represented by the following general formula (1):

wherein X are independently —CH$_2$—, —CH$_2$O—, or —Y—NR—CO— wherein Y is —CH$_2$— or a group represented by the formula:

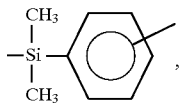

and R is a hydrogen atom, a methyl group, a phenyl group or an allyl group; p are independently 0 or 1, L is an integer of 2 to 6, and m and n are each an integer of 0 to 200.

5. The rubber composition of claim 1, wherein the component (A) is a reaction product obtained by subjecting a straight chain fluoropolyether compound having a molecular weight of 400 to 100,000 represented by the general formula (1) as defined in claim 4 and an organosilicon compound having two SiH groups in its molecule to hydrosilylation reaction.

6. The rubber composition of claim 1, wherein the component (B) is selected from the group consisting of a homopolymer of tetrafluoroethylene and its decomposition products.

7. The rubber composition of claim 1, wherein the component (C) is a straight chain or cyclic organohydrogenpolysiloxane having, in its molecule, at least two units represented by the following formula:

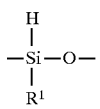

wherein R$^1$ is monovalent organic groups which may be the same or different.

8. The rubber composition of claim 7, wherein the monovalent organic group R$^1$ in the formula defined in claim 7 is selected from the class consisting of a substituted or unsubstituted monovalent hydrocarbon group having 1 to 20 carbon atoms; and a fluorine-containing monovalent organic group having 3 to 30 carbon atoms represented by the formula —Z—Rf— wherein Z is a divalent connecting group for connecting Rf to Si, and Rf is a monovalent perfluoroalkyl group or a monovalent perfluoroalkyl ether group.

9. The rubber composition of claim 1, wherein the component (D) is a compound selected from the group consisting of transition metals and their compounds.

10. The rubber composition of claim 1, wherein the amounts of the components (B) and (C) are 5 to 50 parts by weight and 0.1 to 20 parts by weight, per 100 parts by weight of the component (A), respectively, and the amount of the component (D) is 0.1 to 500 ppm, in terms of the content of a transition metal, based on the total weight of the component (A) and the component (C).

11. A cured product obtained by curing the rubber composition of claim 1.

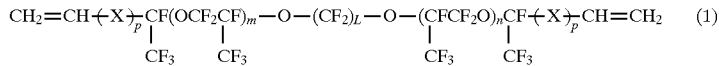

* * * * *